(12) United States Patent
Bailey et al.

(10) Patent No.: US 7,549,090 B2
(45) Date of Patent: *Jun. 16, 2009

(54) AUTONOMIC RECOVERY FROM HARDWARE ERRORS IN AN INPUT/OUTPUT FABRIC

(75) Inventors: David Alan Bailey, Kasson, MN (US); Trung Ngoc Nguyen, Rochester, MN (US); Gregory Michael Nordstrom, Pine Island, MN (US); Kanisha Patel, Cedar Park, TX (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/466,290

(22) Filed: Aug. 22, 2006

(65) Prior Publication Data

US 2006/0281630 A1 Dec. 14, 2006

Related U.S. Application Data

(63) Continuation of application No. 10/438,392, filed on May 15, 2003, now Pat. No. 7,134,052.

(51) Int. Cl.
*G06F 11/00* (2006.01)
(52) U.S. Cl. .......................................... 714/43; 370/216
(58) Field of Classification Search .................... 714/43, 714/56; 370/216
See application file for complete search history.

(56) References Cited

U.S. PATENT DOCUMENTS 4,672,537 A 6/1987 Katzman et al.

(Continued)

OTHER PUBLICATIONS

"Operation and Use, vol. 1 Using the Parallel Operating Environment" by IBM, obtained Jan. 6, 2006 from "http://www.nersc.gov/vendor_docs/ibm/pe/am102mst12.html".

*Primary Examiner*—Robert Beausoliel
*Assistant Examiner*—Philip Guyton
(74) *Attorney, Agent, or Firm*—Wood, Herron & Evans, LLP

(57) ABSTRACT

An apparatus, program product and method propagate errors detected in an IO fabric element from an IO fabric that is used to couple a plurality of endpoint IO resources to processing elements in a computer. In particular, such errors are propagated to the endpoint IO resources affected by the IO fabric element in connection with recovering from the errors in the IO fabric element. By doing so, a device driver or other program code used to access each affected IO resources may be permitted to asynchronously recover from the propagated error in its associated IO resource, and often without requiring the recovery from the error in the IO fabric element to wait for recovery to be completed for each of the affected IO resources. In addition, an IO fabric may be dynamically configured to support both recoverable and non-recoverable endpoint IO resources. In particular, IO fabric elements within an IO fabric may be dynamically configured to enable machine check signaling in such IO fabric elements in response to detection that an endpoint IO resource is non-recoverable in nature. The IO fabric elements that are dynamically configured as such are disposed within a hardware path that is defined between the non-recoverable resource and a processor that accesses the non-recoverable resource.

11 Claims, 5 Drawing Sheets

U.S. PATENT DOCUMENTS

| | | |
|---|---|---|
| 5,394,542 A | 2/1995 | Frey et al. |
| 5,978,938 A | 11/1999 | Kaiser et al. |
| 5,991,900 A | 11/1999 | Garnett |
| 6,032,271 A | 2/2000 | Goodrum et al. |
| 6,643,727 B1 | 11/2003 | Arndt et al. |
| 6,829,729 B2 | 12/2004 | Hicks et al. |
| 6,901,537 B2 | 5/2005 | Dawkins et al. |
| 6,934,888 B2 | 8/2005 | McIntosh et al. |
| 6,976,191 B2 | 12/2005 | Kitamorn et al. |
| 2002/0184576 A1 * | 12/2002 | Arndt et al. .................. 714/48 |

* cited by examiner

AUTONOMIC RECOVERY FROM HARDWARE ERRORS IN AN INPUT/OUTPUT FABRIC

CROSS-REFERENCE TO RELATED APPLICATION

This application is a Continuation of U.S. patent application Ser. No. 10/438,392 filed on May 15, 2003 by David Alan Bailey et al., entitled "AUTONOMIC RECOVERY FROM HARDWARE ERRORS IN AN INPUT/OUTPUT FABRIC" (now issued as U.S. Pat. No. 7,134,052), which application is incorporated by reference herein in its entirety.

FIELD OF THE INVENTION

The invention relates to computers and computer software, and in particular, to managing failures in hardware resources coupled to computers.

BACKGROUND OF THE INVENTION

Given the continually increased reliance on computers in contemporary society, computer technology has had to advance on many fronts to keep up with both increased performance demands, as well as the increasingly more significant positions of trust being placed with computers. In particular, computers are increasingly used in high performance and mission critical applications where considerable processing must be performed on a constant basis, and where any periods of downtime are simply unacceptable.

Increases in performance often require the use of increasingly faster and more complex hardware components. Furthermore, in many applications, multiple hardware components, such as processors and peripheral components such as storage devices, network connections, etc., are operated in parallel to increase overall system performance.

Along with the use of these more complex components, the software that is used to operate these components often must be more sophisticated and complex to effectively manage the use of these components. For example, multithreaded operating systems and kernels have been developed, which permit computer programs to concurrently execute in multiple "threads" so that multiple tasks can essentially be performed at the same time. For example, for an e-commerce computer application, different threads might be assigned to different customers so that each customer's specific e-commerce transaction is handled in a separate thread.

One logical extension of a multithreaded operating system is the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

With logical partitioning, a shared program, often referred to as a "hypervisor" or partition manager, manages the logical partitions and facilitates the allocation of resources to different logical partitions. For example, a partition manager may allocate resources such as processors, workstation adapters, storage devices, memory space, network adapters, etc. to various partitions to support the relatively independent operation of each logical partition in much the same manner as a separate physical computer.

Along with the increased performance available in the aforementioned computer environments, however, comes increased potential for failure. Performing tasks in parallel often raises the possibility that one task may conflict with another task being performed, resulting in corrupt data or system failures. Likewise, as hardware-based components are always subject to at least some risk of failure, and as this risk often increases with the complexity of the hardware component, the use of increasing numbers of more complex hardware components increases the likelihood of encountering hardware component errors or failures during runtime.

As a result, cooperatively with the development of both multithreaded operating systems and logical partitioning, significant development efforts have been directed toward incorporating fault tolerance, high availability, and self-healing capabilities into modem computer designs.

One particular area to which development efforts have been directed is that of managing failures associated with the peripheral hardware components utilized by a computer, e.g., storage devices, network connections, workstations, and the adapters, controllers and other interconnection hardware devices utilized to connect such components to the central processing units of the computer. Peripheral components, which are referred to hereinafter as input/output (IO) resources, are typically coupled to a computer via one or more intermediate interconnection hardware devices components that form a "fabric" through which communications between the central processing units and the IO resources are passed.

In lower performance computer designs, e.g., single user computers such as desktop computers, laptop computers, and the like, the IO fabric used in such designs may require only a relatively simple design, e.g., using an IO chipset that supports a few interconnection technologies such as Integrated Drive Electronics (IDE), Peripheral Component Interconnect (PCI) or Universal Serial Bus (USB). In higher performance computer designs, on the other hand, the IO requirements may be such that a complex configuration of interconnection hardware devices is required to handle all of necessary communications needs for such designs. In some instances, the communications needs may be great enough to require the use of one or more additional enclosures that are separate from, and coupled to, the enclosure within which the central processing units of a computer are housed.

Often, in more complex designs, peripheral components such as IO adapters are mounted and coupled to an IO fabric using "slots" that are arrayed in either or both of a main enclosure or an auxiliary enclosure of a computer. Other components may be mounted or coupled to an IO fabric in other manners, e.g., via cables and other types of connectors, however, often these other types of connections are referred to as "slots" for the sake of convenience. Irrespective of the type of connection used, an IO slot therefore represents a connection point for an IO resource to communicate with a computer via an IO fabric. In some instances, the term "IO slot" is also used to refer to the actual peripheral hardware component mounted to a particular connection point in an IO fabric, and in this regard, an IO slot, or the IO resource coupled thereto, will also be referred to hereinafter as an endpoint IO resource.

Managing endpoint IO resources coupled to a computer via an IO fabric is often problematic due to the typical capability of an IO fabric to support the concurrent performance of multiple tasks in connection with multiple endpoint IO resources, as well as the relative independence between the various levels of software in the computer that accesses the IO resources. Failures occurring in the endpoint IO resources, as well as failures occurring in the components in the IO fabric itself, can also have a significant impact on the ability to access other endpoint IO resources in the system. Furthermore, given the desire for minimizing the adverse impact of failures in individual components to maintain overall system availability, significant efforts have been directed toward isolating failures and dynamically reconfiguring a system to overcome these failures.

In a logically-partitioned system, for example, IO slots can be assigned to individual logical partitions, and device drivers in each logical partition can control the IO adapter in each IO slot assigned to that partition. These IO slots are commonly connected to the overall computer and processor/memory complex through a common IO fabric that is effectively shared by all partitions having slots connected through common interconnection elements of that fabric.

In some logically-partitioned systems, the IO fabric may be comprised of a bridge fabric element connecting the processor/memory bus over a cabling bus to an external IO enclosure, and one or more additional bridge elements connecting the cabling bus to an IO bus having multiple IO slots. One such cabling bus implementation is a Remote Input/Output (RIO) bus, with a processor bridge referred to as a RIO hub used to interface the RIO bus with the process/memory complex, and with RIO bridge elements disposed in each external IO enclosure connecting the cabling bus to a plurality of PCI Host Bridges (PHB's) and, connected to each PHB, a plurality of PCI-PCI bridges that create the individual IO Slot connections into which are plugged PCI IO adapter cards.

In such systems, when an element of the IO fabric hardware detects an error, that hardware element typically enters an error state that suppresses continuing data transfer in either direction between the processor/memory complex and the remaining IO fabric and IO slot elements. Suppression of data transfer in this error state is precisely defined such that the element in error state discards all processor stores and adapter DMA's, and returns all-ones bitwise data to all processor loads.

It is common in many systems, particularly those employing PCI-compatible IO buses and adapters, for device drivers to use memory-mapped IO (MMIO) to communicate with the IO adapters. This allows device drivers installed in the partition operating systems to treat the adapter as if it were logically connected directly to the processor/memory bus and just an extension of the system memory occupying a particular memory address range. A device driver communicates with the adapter using processor load or store instructions targeting "memory" addresses that correlate directly to internal adapter facilities. In such a model the device drivers are largely unaware of the composition and arrangement of IO fabric elements, and rely on the IO fabric and IO adapters to behave as if the device drivers were simply accessing a memory region in response to a memory-mapped load or store.

In such systems, the device drivers typically rely on one of two methods to detect errors relating to the IO fabric. In the first method, the IO fabric is required to signal a machine check condition to a requesting processor when an MMIO load encounters a fabric element in an error state. A machine check is typically indicated by the return of a status signal with an access request or the triggering of an interrupt, and typically results in a processor diverting execution to a machine check interrupt handler that nearly always results in termination of the operating system and any applications executing thereon, due to data integrity concerns as a result of not being able to verify that previously-issued stores were successfully completed. In this case, the device driver and operating system are generally designed such that they cannot recover from the error without loss of data integrity. As a result, the common response to the error is to terminate execution of the entire logical partition (or system in a non-partitioned system).

In the second method, by convention, when in an error state IO fabric and IO adapter are configured to respond to memory-mapped loads by returning a specific set of data that may be recognized by a device driver as potentially signifying an error. For example, one common set of data is referred to as all-ones bitwise data, where each bit of data returned in response to the memory-mapped load is set to one. In this case, the device driver is designed to inspect memory-mapped load reply data for an all-ones pattern, and in such cases, to call operating system services to determine if any element of the platform hardware had entered an error state that would cause this result. In many instances, the error state can be recovered from in the non-machine check method without terminating execution of a logical partition or operating system.

Machine check-based techniques predated many of the advances in dynamic recovery from hardware errors, and as such, device drivers and IO resources that require machine checks to be signaled are often non-recoverable in nature. The latter technique described above, however, often avoids the generation of machine checks and provides greater recoverability when used in connection with an appropriate recovery protocol, and as a result, device drivers and IO resources that rely on this technique are more typically recoverable in nature.

Using either approach, recovering from the IO fabric error, e.g., capturing error isolation data, resetting the affected hardware, and resuming normal IO operations, typically must be synchronized in such a way as to ensure that each affected device driver and IO adapter reliably detect the error condition, and that, until they detect this condition, IO between the device driver and that adapter is required to continue as if the fabric error state persisted. However, the time from the point at which the error is detected by the platform hardware and partition manager until all affected device drivers have also detected the error is unpredictable, and may be excessively long, which can significantly complicate and delay IO fabric recovery. In extreme cases, a device driver—such as for a CD ROM drive that may not be active at the moment of the error—may not perform an MMIO load from its adapters for extremely long periods, even as much as days, weeks, or months, depending on how long the device driver is itself active but not using its associated IO adapter.

On one hand, waiting for all device drivers to independently detect an error condition before completing the recovery from an IO fabric error often leads to excessive delays, unpredictable results and the possibility that a device driver in one logical partition could prevent other logical partitions from recovering. On the other hand, specifically alerting device drivers of errors in the IO fabric to permit recovery of the IO fabric to be completed can be problematic, particularly in logically-partitioned systems, due to incompatibility with older device drivers and the need to change, redesign or enhance device driver and kernel interfaces in complex ways.

Accordingly, a significant need exists in the art for a faster, more autonomous and more efficient manner of ensuring the device drivers for affected IO resources are able to detect and recover from errors in an IO fabric, particularly in logically-partitioned computers and the like, and especially facilitating the use of existing device drivers.

Another problem associated with non-recoverable device drivers that require machine checks to be performed, particularly in a logically-partitioned system, is that initializing the IO fabric typically exposes all partitions having a set of fabric elements in common to machine checks. This is highly undesirable in a partitioned system in that an error resulting from the failure of an IO adapter in use by one partition can result in machine check-initiated termination of multiple other partitions sharing common elements of that fabric.

In many computer environments, non-recoverable device drivers and IO resources have or will be replaced with recoverable device drivers and IO resources due to the significantly-reduced effect on system availability. As a result, it is often desirable to utilize only recoverable device drivers and IO resources whenever possible. In some environments, however, older legacy IO resources and device drivers may still be in use, and may not support more advanced recovery protocols. Furthermore, both non-recoverable and recoverable device drivers may be available for some IO resources.

As a result, in practice it is very difficult to identify which installed IO resources have recoverable device drivers, or for a particular resource, which version(s) of its device driver might require machine checks. Additionally, as customers reconfigure logical partition IO assignments, update device drivers, or add new IO adapters, it is possible that a partition that was uniformly one type or the other might be reconfigured such that this partition either obtains a mix of both types of device drivers or becomes uniformly the other type.

Consequently, a significant need also exists in the art for a manner of detecting the recoverability of IO resources and device drivers therefor in a mixed environment (i.e., where recoverable and non-recoverable resources and device drivers are permitted to co-exist), and dynamically configuring an IO fabric to reliably manage IO errors yet minimize the utilization of machine checks whenever possible.

SUMMARY OF THE INVENTION

The invention addresses these and other problems associated with the prior art by providing in one aspect a manner of synchronizing recovery of a plurality of endpoint IO resources from errors in an IO fabric used to couple the plurality of endpoint IO resources to processing elements in a computer. In particular, embodiments consistent with the invention may effectively propagate an error detected in a particular IO fabric element in an IO fabric to the endpoint IO resources affected by such IO fabric element in connection with recovering from the error in the IO fabric element. By doing so, a device driver or other program code used to access each affected IO resources may be permitted to asynchronously recover from the propagated error in its associated IO resource, and often without requiring the recovery from the error in the IO fabric element to wait for recovery to be completed for each of the affected IO resources.

Therefore, consistent with one aspect of the invention, an error in an IO fabric element, which provides access to a plurality of endpoint IO resources, is handled by establishing an error state for each of the plurality of endpoint IO resources, and recovering from the error in the IO fabric element, in response to a detected error in the IO fabric element.

The invention addresses additional problems by providing in another aspect a manner of dynamically configuring an IO fabric to support both recoverable and non-recoverable endpoint IO resources. In particular, IO fabric elements within an IO fabric may be dynamically configured to enable machine check signaling in such IO fabric elements in response to detection that an endpoint IO resource is non-recoverable in nature. The IO fabric elements that are dynamically configured as such are disposed within a hardware path that is defined between the non-recoverable resource and a processor that accesses the non-recoverable resource.

Therefore, consistent with another aspect of the invention, an IO fabric that comprises a plurality of IO fabric elements providing access for at least one processor to a plurality of endpoint IO resources may be dynamically configured by detecting that a first endpoint IO resource among the plurality of endpoint IO resources is a non-recoverable resource, and in response thereto, dynamically enabling machine check signaling in each IO fabric element defined in a hardware path between the processor and the first endpoint IO resource.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figures 1, 2:
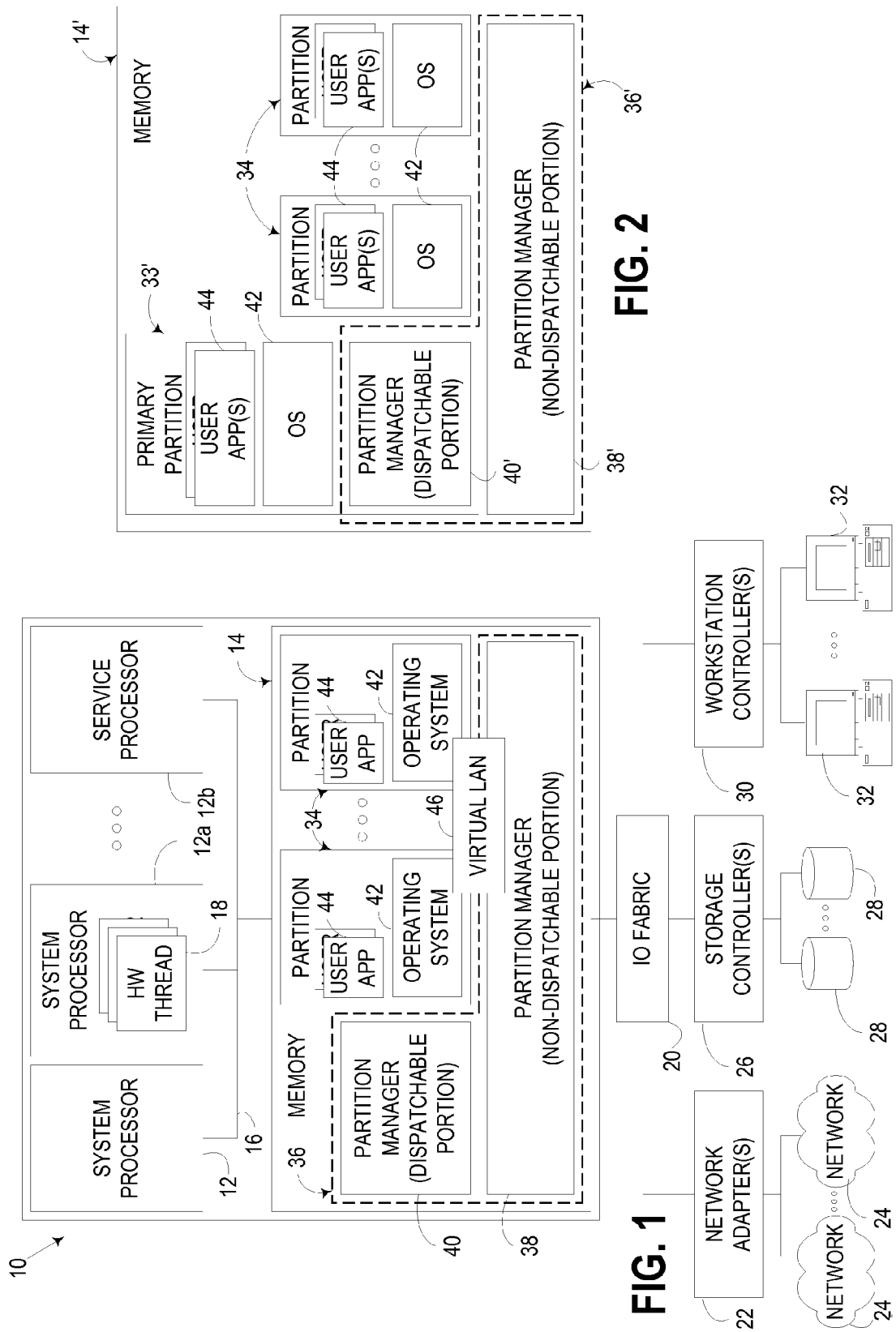
FIG. 1 is a block diagram of the principal hardware components in a logically-partitioned computer consistent with the invention.
FIG. 2 is a block diagram of an alternate logical-partitioning architecture to that illustrated in FIG. 1.

The embodiments discussed hereinafter utilize autonomic recovery techniques in association with managing IO resources in a computer, e.g., peripheral hardware components such as network connections, storage devices, printers, workstations, and/or the adapters and/or controllers therefor.

In one respect, the embodiments discussed hereinafter support the ability to propagate errors detected in an IO fabric element in an IO fabric down to the individual IO resources affected by the error. By doing so, errors can be corrected dynamically in the IO fabric, while persisting an error state in each affected IO resource until that error is independently addressed in a partition or operating system that utilizes the IO resource. By doing so, synchronization of resource and fabric error recovery is greatly simplified, particularly for logically-partitioned environments where multiple logical partitions may share a particular IO fabric domain.

In another respect, the embodiments discussed hereinafter support the ability to accommodate both recoverable and non-recoverable IO resources in the same IO fabric. The accommodation of both recoverable and non-recoverable IO resources is managed in the illustrated embodiments by selectively switching one or more IO fabric elements that are disposed in a path between a computer processor and an IO resource to enable machine checks whenever it is determined that the IO resource is non-recoverable.

In this context, a recoverable IO resource is a resource that is configured to be dynamically recovered, i.e., during normal system operation, in response to a recovery protocol performed during operation of a computer. Typically, an IO resource is recoverable when a device driver therefor, resident in an operating system of a logical partition, or an operating system of a non-logically-partitioned computer, supports a recovery protocol for the resource. Recoverability of an IO resource may also be based upon support provided in other operating system or kernel services, as well as other software and/or hardware features in an IO fabric. Also, given that recoverability of an IO resource is typically dependent at least in part on support for a recovery protocol in the device driver used to manage that resource, an IO resource that is recoverable when used with a suitable device driver may be non-recoverable in situations where an older device driver, which does not support a recovery protocol, is used to manage the resource.

A non-recoverable IO resource, in contrast, does not support dynamic recovery. In many contexts, non-recoverability of an IO resource requires that processor machine checks be generated in response to errors, which typically results ultimately in a termination of an entire operating system and the applications executing thereon, thus requiring a system restart for recovery. In a logically-partitioned computer, it is an objective that a machine check results in only the termination and restart of a logical partition, rather than the entire system.

As will become more apparent below, embodiments consistent with the invention may utilize IO fabrics including an innumerable number and types of IO fabric elements, including, for example, bridge devices, hub devices, switches, connectors, host devices, slave devices, controller devices, cables, modems, serializers/deserializers, optoelectronic transceivers, etc.

Among other benefits, the herein-described techniques facilitate the implementation of slot or resource level partitioning in a logically-partitioned computer, whereby individual IO resources or slots may be bound to specific logical partitions resident in a logically-partitioned computer. It will be appreciated, however, that the techniques described herein may be used in non-logically partitioned environments, as well as with other granularities of resource partitioning, e.g., bus or enclosure level.

Turning now to the Drawings, wherein like numbers denote like parts throughout the several views, FIG. 1 illustrates the principal hardware components in a logically-partitioned computer 10 consistent with the invention. Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like), as well as other multi-user computers including non-logically-partitioned computers.

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multithreaded processor 12a is treated like an independent processor by the software resident in the computer.

In addition, as is also illustrated in FIG. 1, one or more of processors 12 (e.g., processor 12b) may be implemented as a service processor, which is used to run specialized firmware code to manage system initial program loads (IPL's), and to monitor, diagnose and configure system hardware. Generally, computer 10 will include one service processor and multiple system processors, which are used to execute the operating systems and applications resident in the computer, although the invention is not limited to this particular implementation. In some implementations, a service processor may be coupled to the various other hardware components in the computer in manners other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via an IO fabric 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 1 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12b. The non-dispatchable portion 38 provides many of the low level partition management functions for computer 10, e.g., page table management, etc. The non-dispatchable portion 38 also has no concept of tasks, and is accessible principally via function calls from higher layers of software, or interrupts from the hardware.

The second layer of program code in partition manager 36 is referred to herein as a dispatchable portion 40. In contrast to non-dispatchable portion 38, which has no concept of tasks, is run with memory relocation off, and is accessible via supervisor function calls from higher layers of software, the dispatchable portion 40 has the concept of tasks (like any operating system), and is run with memory relocation on. The dispatchable portion typically executes in much the same manner as a partition, except that it is hidden from the user. The dispatchable portion generally manages higher level partition management operations such as creating and deleting partitions, concurrent hardware maintenance, allocating processors, memory and other hardware resources to various partitions 34, etc.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, display devices, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time. In addition, some resources may be "virtual" in nature, e.g., virtual network adapters used in a virtual local area network.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation, as well as other operating systems such as AIX, UNIX, Linux, etc.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, as illustrated in FIG. 2, a memory 14' may instead have resident therein a partition manager 36' having a non-dispatchable portion 38' configured in much the same manner as portion 38 of FIG. 1, but having a dispatchable portion 40' that is incorporated into a primary partition 33' within which is also resident an operating system 42 and one or more user applications 44.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Figure 3:
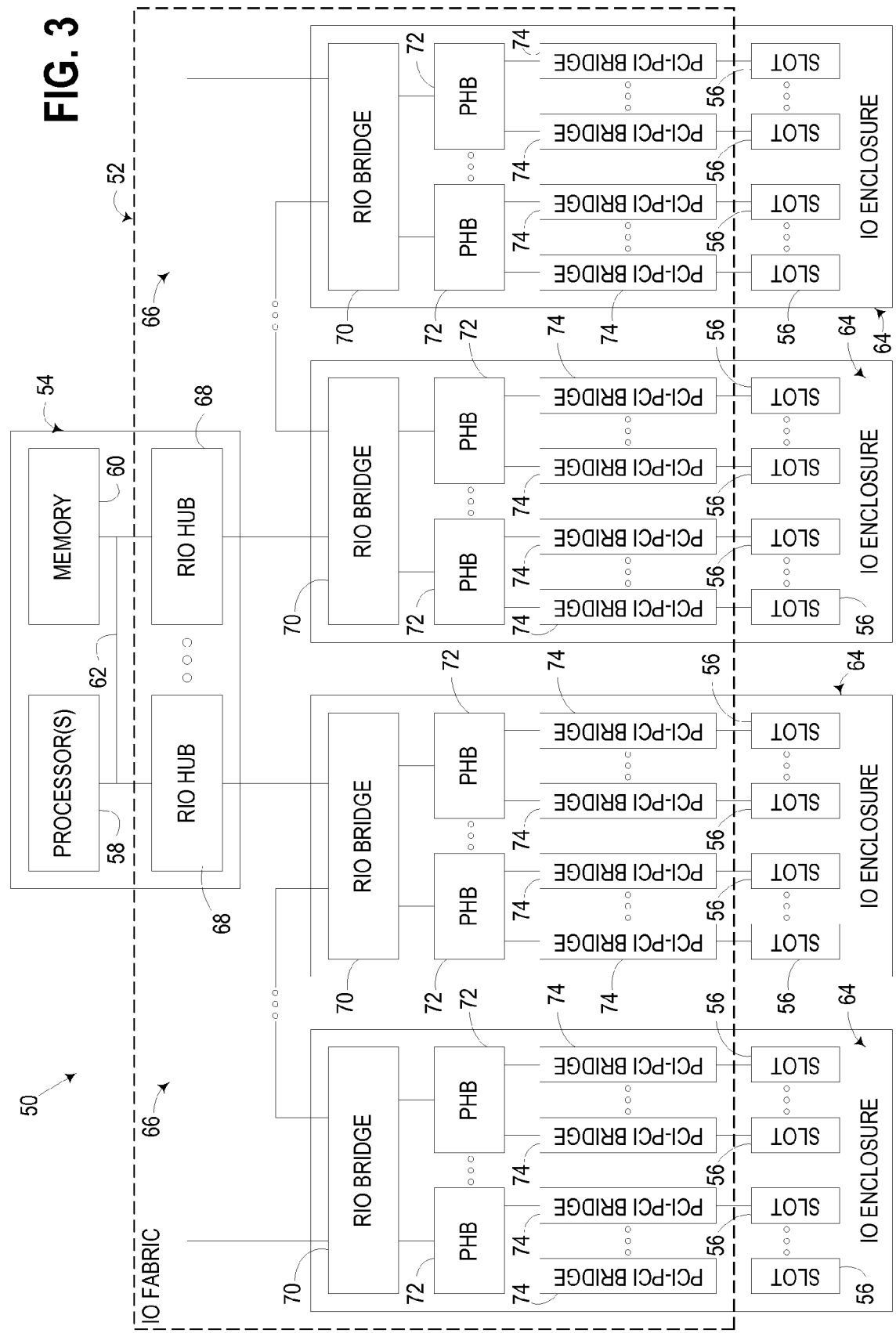
FIG. 3 is a block diagram of an exemplary IO fabric capable of being utilized in connection with autonomic recovery consistent with the invention.

Now turning to FIG. 3, an exemplary computer system 50 with an IO fabric 52, used to couple the Central Electronics Complex (CEC) 54 of the system to a plurality of endpoint IO resources 56 (here, IO slots), is illustrated. CEC 54 is illustrated as including one or more processors 58 and memory 60 coupled to a processor/memory or system bus 62. In the illustrated embodiment, CEC 54 is housed in a separate enclosure from the IO slots 56, and as such, the IO slots are housed in groups in one or more IO enclosures 64. It will be appreciated that in some implementations the components illustrated in FIG. 3 may be incorporated into the same enclosure.

IO fabric 52 comprises one or more remote IO (RIO) networks 66, with each network 66 laid out in a loop topology, including a RIO hub 68 housed in the CEC 54 and coupled to processor/memory bus 62, along with one or more RIO bridges 70 disposed in IO enclosures 64. Each RIO bridge 70 is in turn coupled to one or more PCI host bridges (PHB's) 72 to support a PCI-compatible interface, e.g., PCI, PCI-X or PCI Express. Each PHB 72 hosts a primary PCI bus, to which is coupled to plurality of PCI-PCI bridges 74, each of which in turn connects an associated IO slot 56 to a secondary PCI bus. IO slots 56 may be implemented, for example, as connectors that receive a PCI-compatible adapter card, or PCI adapter chips embedded (soldered) directly on the electronic planar that incorporates the PCI-PCI bridge and/or PHB.

A PCI-based interface supports memory mapped input/output (MMIO). As such, when computer 50 implements a logically-partitioned environment, the logical partition operating systems may be permitted to "bind" processor addresses to specific PCI adapter memory, for MMIO from a processor 58 to the adapters, and addresses from memory 60 to the adapters, to enable adapters to DMA to or from memory 60.

In the illustrated embodiment, utilizing PCI-PCI bridges 74 intermediate PHB's 72 and IO slots 56 enables additional signaling and adapter binding isolation between individual adapters and the PHB's 72, RIO elements 68, 70, processors 58, and memory 60. The additional isolation facilitates assignment of individual IO slots to different logical partitions, such that logical partitions can share the IO fabric hardware connected in common to the PCI-PCI bridges 74, but the operation of IO slots 56 assigned to other logical partitions does not disrupt the operation of an adapter assigned to a particular logical partition, and the adapter address bindings are enforced so that no logical partition or adapter can use another partition-adapter binding. In other embodiments, multiple IO slots may be coupled to a given PCI-PCI bridge, although by doing so it may be necessary that all IO slots coupled to a PCI-PCI bridge be bound to the same logical partition in a logically-partitioned computer. Also, in other embodiments, multiple slots may be connected to a PHB providing internal isolation facilities for each slot.

Also in the illustrated embodiment, a hot plug controller is desirably associated with each IO slot, and incorporated into either PHB's 72 or PCI-PCI bridges 74, to allow electrical power to be selectively applied to each IO slot 56 independent of the state of power to other IO slots 56 in the system. In addition, in some embodiments, groups of IO fabric elements may be integrated into a common integrated circuit or card. For example, multiple PCI-PCI bridges 74 may be disposed on a common integrated circuit.

In addition, in the illustrated embodiment, each PCI-PCI bridge 74 is capable of managing an error state for its associated IO slot, such that errors from the IO fabric can be propagated to the relevant IO slots. In the alternative, a PHB or other IO fabric element may incorporate functionality to manage the error state for multiple IO slots coupled to the IO fabric.

It will be appreciated that an innumerable number of alternate configurations that support the communication between an endpoint IO resource and a processor in a computer may be utilized for an IO fabric consistent with the invention. For example, a number of different interconnect standards, including but not limited to USB, SCSI, IDE, IEEE-1394, PCI-Express, Fibre Channel, and InfiniBand, may be used in lieu of, or in addition to, PCI. Moreover, alternate numbers and configurations of bridges, switches, hosts, hubs, enclosures, adapters, connectors, communication protocols, controllers, and other types of hardware devices may be incorporated into an IO fabric consistent with the invention. It will therefore be appreciated that the configuration of FIG. 3 is merely exemplary in nature, and the invention is not limited to the particular configuration disclosed herein.

As noted above, embodiments consistent with the invention may support the propagation of IO fabric errors to IO resources to facilitate device driver error detection and recovery for such errors and/or the dynamic reconfiguration of portions of an IO fabric between machine check and non-machine check modes to support a mixed environment of recoverable and non-recoverable IO resources. In this regard, an exemplary embodiment, utilizing a logically-partitioned environment in connection with the exemplary IO fabric architecture described in connection with FIG. 3, is presented below. It will be appreciated, however, that the invention is not limited to this particular embodiment.

In the illustrated embodiment, IO fabric elements implement an error state in which the fabric element, when it has detected an error condition, (1) discards MMIO stores to endpoints; (2) returns all-ones data to MMIO loads; and (3) discards DMA writes and rejects or returns an error status to DMA read requests (e.g., on a PCI bus, a PHB may respond to DMA read requests with a Target Abort or Retry status).

Moreover, in the illustrated embodiment, the IO fabric elements are dynamically reconfigurable between machine check and non-machine check modes. As such, when in machine check mode, along with returning all-ones data to an MMIO load, a fabric element returns an error status that induces a machine check interrupt in the processor.

Recoverable device drivers utilized in the illustrated embodiment detect all-ones load replies and do not require a machine check for a fabric error state. The partition manager initializes the IO fabric so that machine checks are not signaled in fabric error states. Prior to activating any partitions, the partition manager initializes all fabric elements such that they do not signal machine checks when they enter an error state. When non-recoverable device drivers are detected, and the slot configuration satisfies the error isolation policies of the partitioned system, the partition manager modifies the fabric elements dynamically to activate machine check signaling for those fabric elements that interconnect to form a hardware path between the processor/memory bus and the IO adapter slot. Similarly, when the IO adapter slot is no longer under the control of a non-recoverable device driver, the partition manager is also able to modify the fabric elements dynamically to return those fabric elements to their non-machine check mode.

At any point in the fabric, there may be a junction of paths between two slots. When modifying fabric elements to enable or disable machine check signaling, the partition manager insures that at this junction, and in the path from this junction to the processor/memory bus, the fabric elements are properly initialized so that if either slot requires machine check error mode, these elements forming the common path between the slots and the processor/memory bus are set to signal machine checks.

Figure 4:
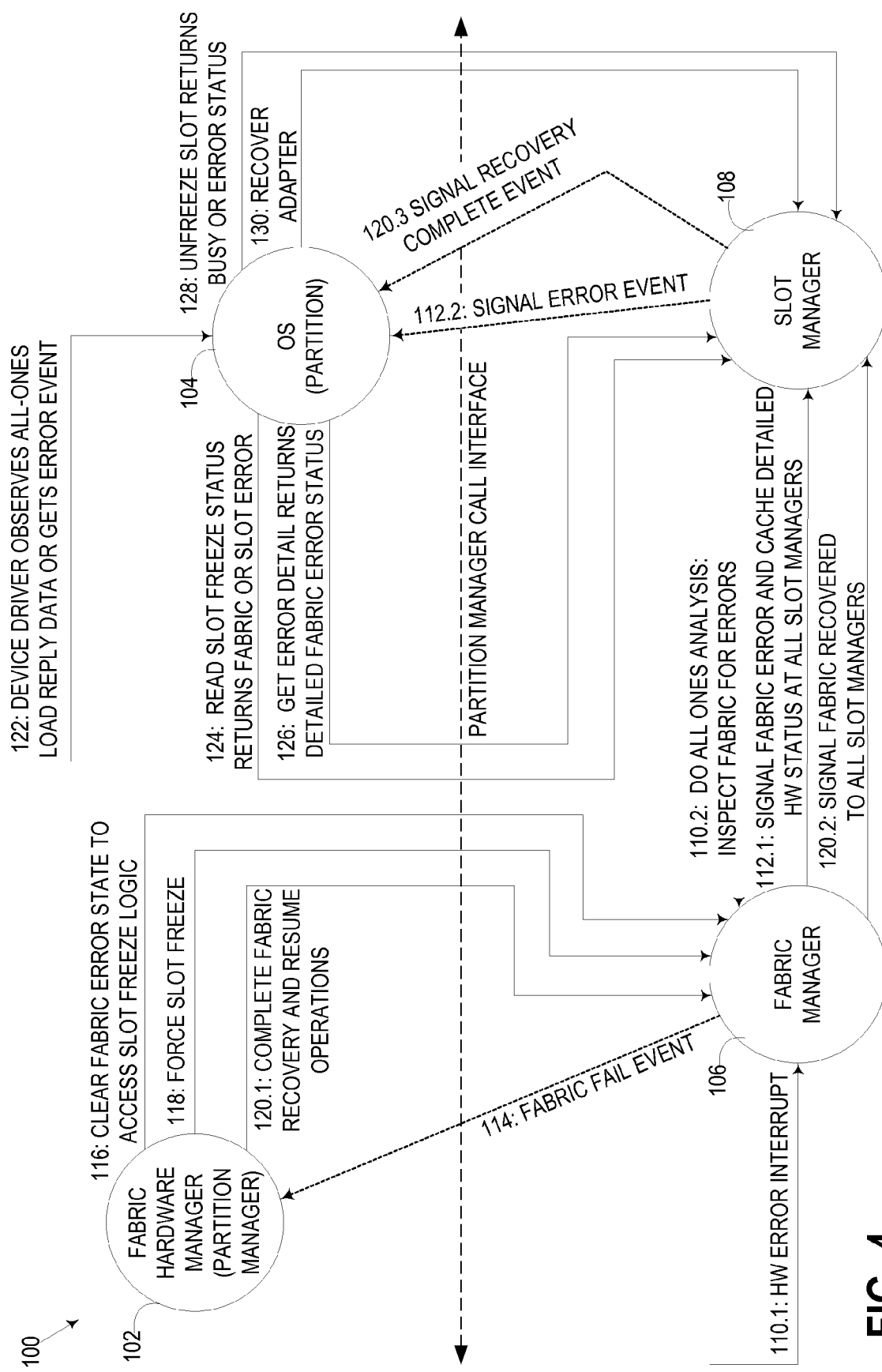
FIG. 4 is a flowchart illustrating the detection and recovery from an IO fabric error in the IO fabric of FIG. 3.

FIG. 4 illustrates at 100 an exemplary flow for detecting and recovering IO fabric errors with recoverable device drivers. The dispatchable portion of the partition manager includes a fabric hardware manager 102. The fabric hardware manager 102 performs most of the fabric hardware initialization and recovery sequencing using tasks. The non-dispatchable portion of the partition manager performs authority checks to enable partition device drivers to operate on IO adapters in slots assigned to the partition. Additionally, the non-dispatchable portion of the partition manager receives fabric IO hardware interrupts, and is callable from both the fabric hardware manager 102 and partition operating systems 104 (as represented by the dashed line identified as a partition manager call interface in FIG. 4). The non-dispatchable partition manager signals asynchronous conditions to the fabric hardware manager 102 or partition operating systems 104 using event messages stored on event queues associated with the fabric hardware manager 102 and partition operating system 104, which includes events related to fabric error interrupts.

In FIG. 4, the non-dispatchable portion of the partition manager is shown including a fabric manager component 106 and a slot manager component 108. The fabric manager 106 monitors the state of fabric hardware and receives interrupts from that fabric hardware when errors or other asynchronous conditions occur. The non-dispatchable portion of the partition manager also contains, for each IO adapter slot, a slot manager 108 that monitors the state of an IO slot to perform authority checks and slot operations when called from a partition operating system. The slot manager component 108 also synchronizes fabric manager 106 and partition operating system 104 interactions when a fabric error occurs, and provides a mechanism to store a fabric error status until the partition device driver detects an error and requests the error status.

The sequence of steps 110.1 through 120.3 represents the operations of the partition manager once it becomes aware of a fabric error, i.e., an error in one of the IO fabric elements in an IO fabric. Sequence 122 through 130 represents the operations of a recoverable device driver when it detects an all-ones load reply. Both sequences may occur more or less simultaneously, and steps 128 and 130 are synchronizing steps between these two sequences. Note that the device driver may omit step 128 and perform only step 130 if the device driver does not process or record detailed fabric error status.

Steps 110.1 and 110.2 represent the independent mechanisms that signal the partition manager of a possible fabric error. Step 110.1 represents a fabric hardware element signaling an error interrupt to the partition manager interrupt handler, and step 110.2 represents a device driver performing step 124 which then initiates step 110.2 if this occurs prior to the partition manager performing step 112.1 and storing fabric error state at the slot manager 108 for a slot. Steps 110.1 and 110.2 may occur in either order or simultaneously. Note that both the partition manager and the operating system device driver may share a single CPU and so the individual steps of sequences 110.1-120.3 and 122-130 may occur physically in arbitrary order relative to each other, but appear logically sequential from the perspective of the partition manager and device driver.

Examining the sequence 110.1 through 120.3, in step 110.1 the fabric hardware element that has detected an error signals an error interrupt to the partition manager. This interrupt always occurs, even when step 110.2 occurs first and initiates partition manager error detection. That is, step 110.2 may precede the partition manager receiving the step 110.1 interrupt, and step 110.2 may initiate inspection of the fabric hardware so as to result in error status signaled to all affected slot managers in step 112.2. However, the fabric manager 106 does not initiate recovery of the fabric error state in step 114 until the occurrence of the interrupt in step 110.1. When that interrupt does occur, if a device driver has not in step 124 already caused the fabric manager 106 to store fabric error status to the individual slot managers 108 (step 112.1), then the fabric manger 106 interrupt handler collects this status and performs step 112.1.

Additionally, the partition manager normally performs some IO operations to fabric elements or to slots (such as configuration IO to a slot requested through a partition call to the partition manager) and may itself detect an all-ones load reply. When this occurs, the partition manager itself invokes step 110.2 to analyze the fabric for errors in that path.

Following step 112.1, the fabric manager 106 signals an error event to the fabric hardware manager 102, step 114. The fabric hardware manager 102 performs the necessary sequence of hardware operations, steps 116 through 120.1. As the non-dispatchable portion of the partition manager performs all direct hardware accesses, the fabric hardware manager 102 uses partition manager calls to the non-dispatchable partition manager to modify the fabric hardware itself. These partition manager states also communicate to the fabric manager 106 changes in the fabric element states or hardware modes that the fabric manager 106 may need to monitor, as the fabric hardware manager 102 performs the sequence of hardware operations needed to recover the fabric error condition.

In step 112.2, the slot manager 108 signals an error event to the partition operating system 104. The partition operating system 104 optionally enables receiving such events in order to asynchronously detect a fabric or slot error without relying on or waiting until a device driver issues an MMIO load. In some cases, the communications protocol between the device driver and the IO adapter may be such that the device driver performs only or nearly always only MMIO stores, and rarely, if ever, performs MMIO loads. In such cases, receiving an event message in step 112.2 can then act to initiate the device driver sequence 124 through 130.

In step 116, fabric hardware manager 102 uses error state information from the fabric fail event to determine the fabric element in error and initiate recovery of the hardware. While in error state, the fabric element continues to discard MMIO stores and DMA's and to return all-ones to load replies, such that a device driver executing simultaneously in a partition observes this behavior until the fabric hardware manager 102 can replicate this error state in (that is, freeze) each slot reached through this fabric element. Therefore, in step 116, the fabric hardware manager 102 restores the fabric to a state in which the fabric hardware manager 102 can access hardware at the IO adapter slots and induce a freeze condition.

In the illustrated embodiment, a partition device driver performs all PCI configuration IO using partition manager calls that directly communicate with the slot manager 108, so that the slot manager 108 can directly return a fabric error status (following the occurrence of steps 112.1 and 112.2) to the partition in executing the configuration IO partition manager call. Device drivers perform memory-mapped IO using partition virtual addresses mapped to the adapter (slot) PCI memory and these must continue to return all-ones to loads and discard stores while the fabric element is in recovery. Therefore, in the illustrated embodiment, the platform slot hardware provides a mechanism by which the partition manager in step 116 may use configuration IO operations directed at the PCI-PCI bridge element that connects the slot to establish a freeze state in the bridge.

In step 116, then, the fabric hardware manager 102 restores the fabric element to a state in which it can perform configuration IO, leaving the fabric element in an error state such the memory-mapped operations continue to discard stores and return all-ones to loads, until the fabric hardware manager 102 establishes this same freeze or error state in each slot reached through that fabric element. While the illustrated embodiment utilizes configuration IO to the slot PCI-PCI bridge, it should be apparent that other mechanisms may be provided in fabric hardware to provide an equivalent capability, such as providing distinct and individually enabled real address ranges to map PCI memory separately from fabric hardware, and reenabling only the fabric address ranges during step 116 recovery.

In step 118, the fabric hardware manager 102 uses partition manager calls to perform the configuration IO that establishes a freeze condition in the PCI-PCI bridge element of the fabric, so each slot reached through the fabric element is placed in an error state. Following this, when in step 120.1 the fabric hardware manager 102 fully restores the fabric element to its normal operating state, the PCI-PCI bridge at each slot has replicated the original fabric error state and discards stores and DMA's and returns all-ones to load replies, thus effectively propagating the fabric error to the affected IO slots.

While in the illustrated embodiment the PCI-PCI bridge performs this function, it should be apparent that other elements of the fabric could provide equivalent functions, e.g., based on memory-mapped adapter address and DMA source address ranges assigned to individual slots.

In step 120.1, the fabric hardware manager 102 having replicated the freeze state at each affected slot completes the recovery of the fabric element and signals the fabric manger 106 that fabric recovery is complete. The fabric manger 106 in step 102.2 signals the individual slot managers 108 that fabric recovery is complete, and these slot managers 108 reflect this in their internal slot state information. In turn, each slot manager 108 in step 120.3 optionally signals an event to the partition operating system 104 that recovery is complete. As in relation to step 112.2, the partition may optionally enable receipt of such events as a means to initiate the sequence 122 through 130, or a subset of that sequence. Otherwise, no events may be passed to the partition operating system in some embodiments, whereby later polling, such as in the sequence 124-130, by the partition operating system may be used to detect recovery of an IO fabric error.

Referring now to the sequence 122 through 130, performed in the partition operating system 104, in step 122 the partition device driver becomes aware of a possible fabric or slot error condition as a result of receiving all-ones data from an MMIO load. As described above, the partition operating system 104 optionally enables receipt of fabric error event messages and detects the fabric error condition through this mechanism in substitute for or possibly in advance of step 122.

In step 124, the device driver, or a partition kernel utility invoked from the device driver, calls the partition manager to determine if a fabric or slot error condition may be present. If the slot manager 108 has not yet been signaled of a fabric error detected through step 110.1 or 110.2, the slot manager 108 performs step 110.2 to analyze the fabric path for an error state. If this condition is detected, step 110.2 returns the fabric status to the slot manger 108, which in turn returns this status to the partition operating system 104 in step 124.

In the illustrated embodiment, the PCI-PCI bridge enters a fabric error state when it detects an error condition on the PCI secondary bus connecting it to the IO adapter slot. In the illustrated embodiment, the slot manager 108 also inspects the PCI-PCI bridge for this error state, if no higher level fabric error state is detected, and when this state exists returns a status to the partition operating system 104 indicating that there is a slot freeze condition unrelated to other fabric elements.

In step 126, the partition operating system 104 or device driver optionally calls the slot manager 108 to obtain additional fabric error detail for purposes such as logging, or to determine if the fabric error is recoverable. In step 128, the device driver or operating system calls the slot manager 108 to initiate recovery of the slot by removing the slot freeze condition. At this point, the slot manger 108 synchronizes the device driver slot recovery with the fabric manger 106 fabric recovery. If the slot manager 108 has not completed fabric recovery, the slot manager 108 returns a busy status in step 128. The device driver or operating system may then retry the call in step 128 at periodic intervals until the fabric manger 106 has completed step 120.2.

Also in step 128, if the fabric error condition is such that the partition manager cannot restore normal fabric operations without manual intervention—such as hardware service action or a platform reboot or power cycle—the slot manager 108 returns a status indicating that the slot is permanently unavailable, or that is unavailable pending a service action. In that case, the device driver may extend the retry interval to a much longer interval, such as minutes or hours, or may defer further attempts to retry until the partition manager signals a recovery event in step 120.3, if the partition operating system 104 has enabled receipt of such events.

In step 130, following a successful return status, the device driver then performs a sequence of partition manager calls to restore the IO adapter to its operational state, and thus reset the error state of the IO adapter. Such actions may include issuing a reset, such as PCI RST, to the adapter and then re-initializing the adapter completely or re-synchronizing the IO adapter and device driver states and repeating operations that may have been discarded while the fabric was in error state. Upon completion of step 130, the IO adapter is returned to its operational state, with the IO fabric error recovered and communication between the IO adapter and the processor/memory bus restored.

As also noted above, embodiments consistent with the invention may also support the ability to utilize both non-recoverable and recoverable endpoint IO resources in a given IO fabric, and to dynamically adapt to the installation of different types of IO resources in a system. In this regard, it will be appreciated that it is often impossible in practice to identify a resource as being recoverable or non-recoverable until a device driver or other managing program code therefor actually attempts to operate using a machine check mode. As a result, it is desirable in the illustrated embodiment to incorporate operating system or partition manager functions to detect these cases, to determine when the IO configuration is such that a segment of the IO fabric can be operated in machine check mode without disruption to other partitions, and to transition the appropriate elements of the IO fabric into and out of machine check mode at the appropriate times. It is also a desirable feature of the illustrated embodiment for the system itself detect such conditions and dynamically alter the operating mode of the IO fabric to accommodate the momentary requirements of different partitions.

In a logically-partitioned system, the detection of IO errors by one partition desirably must not inhibit partition manager recovery and resumption of IO operations by other partitions having affected IO fabric elements in common. This illustrated embodiment addresses the problem of recovering IO fabric errors immediately subsequent to their occurrence while preserving the above requirements that affected device drivers ultimately and reliably detect that the IO error state had occurred, and that no data transfer occur to or from an adapter until the device driver has detected this error and initiated adapter recovery.

Similarly, in a logically-partitioned system, the requirement of one partition to operate in machine check mode desirably must not unduly expose other partitions to machine checks where these partitions employ recoverable device drivers. The illustrated embodiment therefore further addresses the problems of detecting and enabling machine check mode for device drivers and partitions that require it, without exposing other partitions to machine check mode when they do not require it.

Therefore, for the purposes of the illustrated embodiment, it will be assumed that within the collective device drivers of an operating system, both recoverable and non-recoverable device driver types may be present, with each device driver controlling various slots assigned to that partition operating system. The non-recoverable device drivers represent older, "legacy" technology and generally predate recoverable device driver protocols within operating systems. Therefore, enabling recoverable device driver functions within the IO fabric is typically a function of newer operating system kernel services and device driver functions, in addition to new features in the IO fabric hardware itself to support this model. For example, in some computers using the AIX operating system, a recoverable protocol known as Extended Error Handling (EEH) is used.

Despite that it is often newer device drivers and kernel services that enable IO fabric error states that do not present machine checks, particularly in logically-partitioned systems it is expected that these newer recoverable device drivers constitute the primary type of device driver, and by far the majority of device drivers configured in the partition operating systems. Therefore, the partition manager in the illustrated embodiment desirably defaults to a fabric initialization state that prevents or suppresses machine check signaling and depends on the operating system kernel utilities to detect older, non-recoverable device drivers and to request the partition manager to activate machine check signaling modes within the IO fabric.

Figure 5:
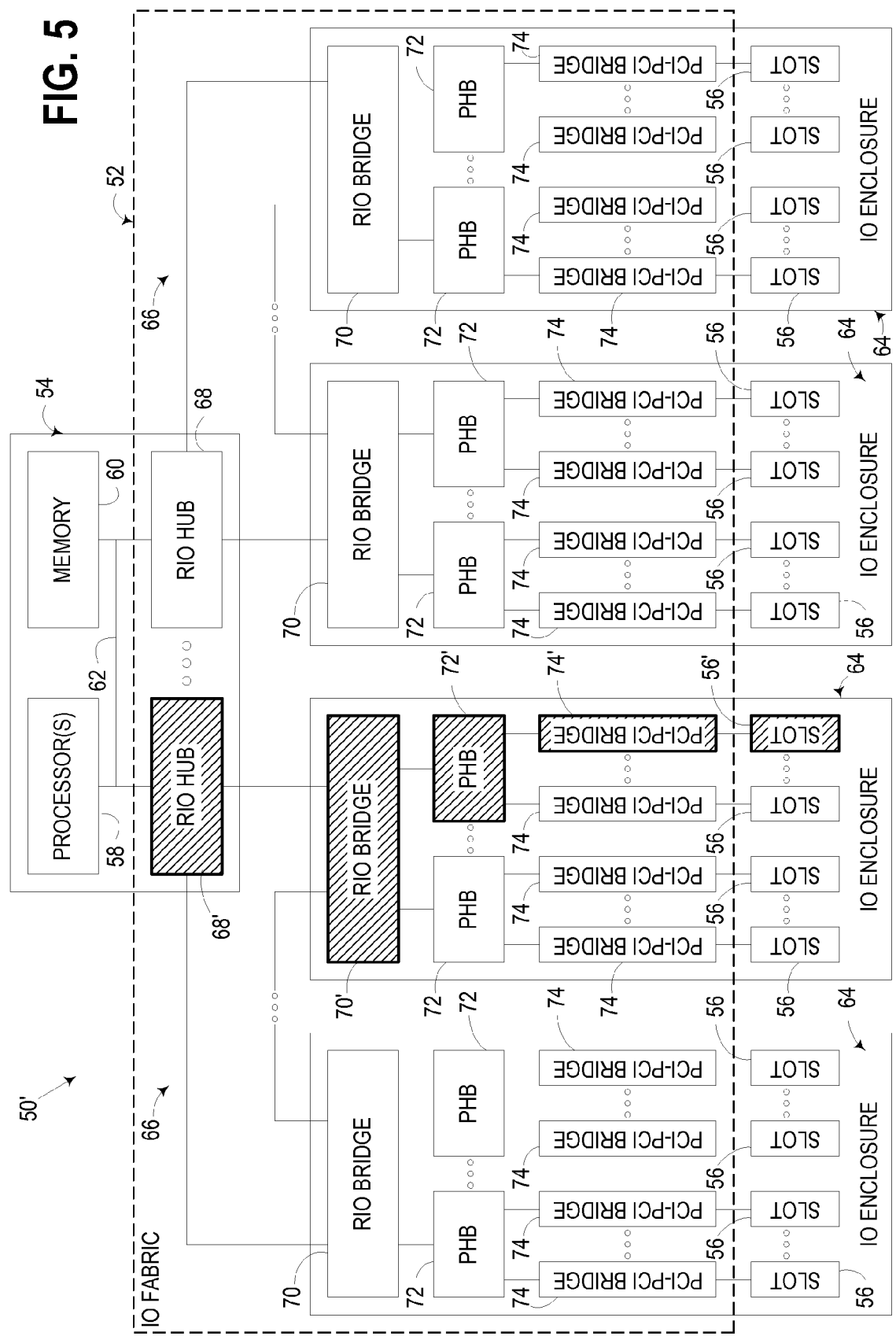
FIG. 5 is a block diagram of the IO fabric of FIG. 3, subsequent to installation of a non-recoverable endpoint IO resource.

For the purposes of illustrating the mixed mode of operation of an IO fabric consistent with the invention, FIG. 5 illustrates an alternate computer architecture 50', in which has been installed a non-recoverable endpoint IO resource in an IO slot 56'. The path between the IO resource and an accessing processor in the computer, e.g., one of processors 58 coupled to processor/memory bus 62, comprises RIO hub 68', RIO bridge 70', PHB 72' and PCI-PCI bridge 74'. Consistent with the invention, whenever a non-recoverable device driver is used in connection with managing an IO resource in IO slot 56', each IO fabric element 68'-74' in the path between IO slot 56' and processor/memory bus 62 is set to enable machine checks.

Figure 6:
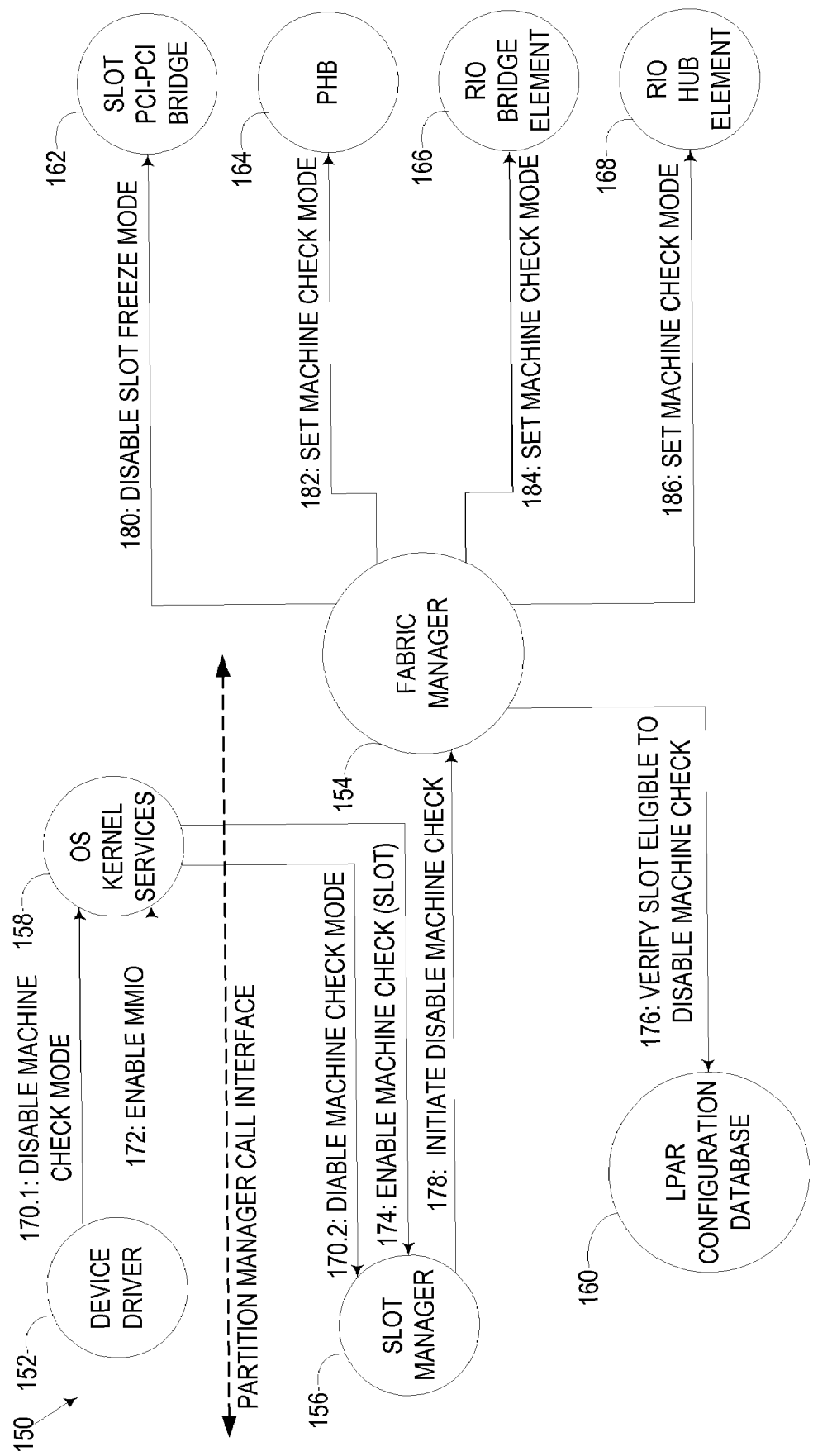
FIG. 6 is a flowchart illustrating the dynamic switching of the IO fabric of FIG. 4 between non-machine check and machine check modes in response to the installation of a non-recoverable endpoint IO resource.

Referring now to FIG. 6, the figure illustrates an exemplary flow 150 for detecting a non-recoverable device driver 152 that requires machine check signaling and modifying the IO fabric hardware operating mode to do so from a fabric element error state or slot error condition. A fabric manager 154 and slot manager 156 from a partition manager are illustrated, along with support OS kernel services 158 provided in the partition within which device driver 152 is resident. Furthermore, a logical partitioning (LPAR) configuration database 160 is illustrated as being coupled to fabric manager 154, along with a plurality of exemplary fabric elements, including a PCI-PCI bridge 162, PHB 164, RIO bridge element 166 and RIO hub element 168.

Dynamic reconfiguration of an IO fabric in response to detection of a non-recoverable device driver is represented in the sequence of steps 170.1 through 186 in FIG. 6. In particular, assume for the purposes of the example that a recoverable device driver 152 performs step 170.1 to signal the kernel utilities 158, and in turn the partition manager (step 170.2), that this device driver 124 is of the recoverable type and does not require machine check signaling. In the illustrated embodiment, typically the partition manager will have already initialized the IO fabric to inhibit machine check signaling, and as such, this operation represents something of an advisory operation with respect to kernel services and the partition manager.

In step 172, device driver 152 may prepare to utilize its associated IO adapter by enabling that adapter for memory-mapped loads and stores, as well as DMA and interrupts. In the illustrated embodiment utilizing PCI adapters, step 172 may represent the device driver 152 calling the partition manager to perform a configuration IO store to the adapter command register with the enable memory, IO, or master operations (DMA) bit(s) set to "1."

If, prior to step 172, the device driver 152 has not performed step 170.1, the device driver 152 is considered to represent an older (legacy) type device driver that does not implement all-ones error detection and is understood to require machine checks on failed MMIO loads (i.e., the device driver is non-recoverable). Either the kernel services 158 or partition manager interfaces that implement the disable machine check (steps 170.1 and 170.2) and MMIO enable (step 172) calls may perform this detection; although, within the illustrated embodiment this detection is delegated to the kernel services 158 which then (step 174) call the appropriate slot manager 156 in the partition manager to enable machine check mode, as part of executing the enable MMIO load service in step 172.

As such, in this implementation, a non-recoverable resource is detected simply through detecting the absence of a request to disable machine check signaling in connection with a device driver attempting to access the resource, e.g., during attempts to initialize the resource, bind to the resource, configure the resource or otherwise establish communication between the device driver and the resource. It will be appreciated that other manners of detecting a non-recoverable resource, e.g., the omission of other kernel calls specified by an operating system during device driver activation and binding to the operating system, may be used in the alternative.

In a logically-partitioned system, an important function of the partition manager of the illustrated embodiment is to ensure inter-partition isolation, which includes preventing the actions of one partition affecting the availability of others. In this case, the objective of a partitioned system is that the enablement of machine check mode by one partition, for a given IO slot, should be limited in its effects to only that partition whenever possible. In the illustrated embodiment, the partition manager limits the configurations in which a device driver may enable machine check signaling such that a particular partition may enable machine checks only within the scope of the IO fabric connecting only IO slots assigned to that partition and no others.

Therefore, in step 176, the fabric manager 154 checks the logical partition configuration database 160 to determine if the slot for which machine check enablement is requested is within a fabric domain that satisfies this restriction. That is, the partition manager allows the partition to establish machine check mode if this can be done at a point within the fabric such that all MMIO loads targeting that point are in relation to slots assigned to only that partition. For example, in the illustrated embodiment, the PHB represents a point at which machine check signaling can be enabled for slots below that PHB so as to not subject other partitions using slots on other PHB's to machine checks. Therefore, in the illustrated embodiment the partition manager allows a partition to establish machine check mode, in step 174, only if all slots connected through that PHB are assigned to that same partition. As a corollary, the partition manager also prevents reassignment of one of these slots to another logical partition at any time that the PHB and higher level elements of the IO fabric are set to machine check mode.

Otherwise, the partition manager in step 174 returns a failure status to the partition manager call, and the kernel service 158 in turn returns failing status in step 172 to the device driver 152. The device driver 152 is thereby prevented from operating the associated IO adapter if establishing machine check mode would contravene the inter-partition policies and mechanisms of the overall system.

Assuming that the IO slot assignments and physical configuration permit enabling machine check mode, the partition manager in steps 178 through 186 proceeds to modify the operating mode of each element in the fabric such that it signals machine check when in its error state, proceeding first from the outward most element of the fabric (e.g., the PCI-PCI bridge 162 for that slot (step 180), sequentially back through the remaining elements of the IO fabric connecting that slot to the processor/memory bus, e.g., a PHB 164 (step 182), a RIO bridge element 166 (step 184), and a RIO hub element 168 (step 186). Other sequences may be used in other embodiments.

Returning briefly to FIG. 5, assuming that the partition manager detects the device driver for the IO resource mounted in IO slot 56' as being non-recoverable in nature, the aforementioned flow thus will result in each fabric element disposed in the path between the IO resource and the processor/memory bus, including PCI-PCI-bridge 74', PHB 72', RIO bridge 70' and RIO hub 68', being enabled for machine check mode.

Returning to FIG. 6, it will be appreciated that, in the illustrated embodiment of a logically-partitioned system, partitions may power-on and off (logically) or may reboot independent of one another. When a partition that had established machine check mode for one or more slots powers-off or reboots, the dispatchable portion of the partition manager therefore signals slot manager 156 for each slot assigned to that partition. The partition manager performs some reinitialization of the slot to prepare it for possible re-assignment to another partition or reactivation of that slot within the same partition when that partition next boots. Partition reboot, in particular, is often associated with updates to or replacements of device drivers, such as a non-recoverable device driver for a slot may be replaced by a recoverable device driver for the IO adapter in that slot as part of a partition reboot or power-off and on.

In such circumstances, it is desirable that fabric manager 154 also recognizes that the partition has terminated its device drivers, in conjunction with a partition power-off or reboot, and if machine check mode is no longer required for other slots that remain active in that fabric domain, to reverse the fabric error mode back to suppressing machine checks. In this case, the fabric hardware manager signals the slot manager 156, which in turn signals the fabric manager 154 for slots associated with a terminated partition. The fabric manager 154 then reverses the sequence of steps 180 through 186, so that the fabric elements that had been in machine check signaling mode are set to no longer signal machine checks.

Various policies may be implemented for controlling whether or not a switch to or from machine check mode is permitted. For example, it may be desirable in a logically-partitioned system to condition the switch of a slot to a machine check mode on the partition owning that slot also owning all other slots on the same PHB (optionally including any empty slots). It may also be desirable to condition such a switch additionally on other error conditions or topologies of a fabric such as a cluster system sharing a fabric in such a manner that interpartition behaviors are isolated.

Return of IO fabric elements to disabling machine check signaling is also typically conditioned upon all slots in a given PHB being returned from machine check modes. It may also be desirable for a partition manager to prevent any slot on a machine check enabled PHB from being transferred to the partition manager or another partition.

It will be appreciated that the implementation of dynamic switching of an IO fabric element between modes in which machine check signaling is enabled or suppressed is within the ability of one of ordinary skill in the art having the benefit of the instant disclosure. Moreover, implementation of the herein-described functionality in software is likewise within the ability of one of ordinary skill in the art having the benefit of the instant disclosure.

Various modifications to the herein-described embodiments will be apparent to one of ordinary skill in the art having the benefit of the instant disclosure. Therefore, the invention lies in the claims hereinafter appended.

What is claimed is:

1. A method of handling an error in an input/output (IO) fabric that includes at least one IO fabric element that provides access to a plurality of endpoint IO resources, the method comprising, in response to a detected error in the IO fabric element:
   propagating the error to the plurality of endpoint IO resources to which the IO fabric element provides access by establishing an error state for each of the plurality of endpoint IO resources to which the IO fabric element provides access; and
   recovering from the error in the IO fabric element.

2. The method of claim 1, further comprising, after recovering from the error in the IO fabric element, and in an operating system having access to a first endpoint IO resource among the plurality of endpoint IO resources:
   detecting the error state of the first endpoint IO resource and performing error recovery on the first endpoint IO resource; and
   resetting the error state for the first endpoint IO resource.

3. The method of claim 1, further comprising, after recovering from the error in the IO fabric element, asynchronously resetting the error state for each of the plurality of endpoint IO resources.

4. The method of claim 3, wherein asynchronously resetting the error state for each of the plurality of endpoint IO resources is performed in response to access requests directed to each of the plurality of endpoint IO resources.

5. The method of claim 3, further comprising, after recovering from the error in the IO fabric element, generating a notification of the error state in a first endpoint IO resource among the plurality of endpoint IO resources, wherein asynchronously resetting the error state for the first endpoint IO resource is performed in response to the notification.

6. The method of claim 1, wherein the IO fabric element is selected from the group consisting of a Peripheral Component Interconnect (PCI) host bridge, a multifunction PCI-PCI bridge device, a Remote Input/Output (RIO) bridge, a RIO hub, and a switch device.

7. The method of claim 1, wherein the plurality of endpoint IO resources includes an IO adapter slot.

8. The method of claim 1, wherein the IO fabric is a memory mapped input/output (MMIO) fabric.

9. The method of claim 1, wherein the IO fabric is coupled to a logically-partitioned computer of the type including a plurality of logical partitions managed by a partition manager, wherein each endpoint IO resource is allocated to a logical partition among the plurality of logical partitions, wherein establishing the error state for each endpoint IO resource and recovering from the error in the IO fabric element are initiated by the partition manager, the method further comprising:
   returning the error state of an endpoint IO resource to a device driver in the logical partition to which such endpoint IO resource is allocated in response to an access request generated by such device driver after recovering from the error in the IO fabric element; and
   in response to returning the error state, using such device driver to recover from the error state in such endpoint IO resource.

10. The method of claim 1, further comprising detecting the error in the IO fabric element from a result of a load operation directed to one of the plurality of endpoint IO resources.

11. The method of claim 1, further comprising detecting the error in the IO fabric element from an interrupt generated in response to the IO fabric element entering an error state.

* * * * *